(12) United States Patent
Perkuhn et al.

(10) Patent No.: US 9,215,084 B2
(45) Date of Patent: Dec. 15, 2015

(54) METHOD AND DEVICE FOR CONTENT PERSONALISATION USING FILE REPAIR REQUESTS

(75) Inventors: Heiko Perkuhn, Aachen (DE); Rene Rembarz, Aachen (DE); Johannes Willig, Herzogenrath (DE); Marc Vorwerk, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 195 days.

(21) Appl. No.: 12/996,173

(22) PCT Filed: Jun. 4, 2008

(86) PCT No.: PCT/EP2008/004445
§ 371 (c)(1),
(2), (4) Date: Dec. 3, 2010

(87) PCT Pub. No.: WO2009/146720
PCT Pub. Date: Dec. 10, 2009

(65) Prior Publication Data
US 2011/0078125 A1  Mar. 31, 2011

(51) Int. Cl.
G06F 17/30 (2006.01)
H04L 12/18 (2006.01)
G06Q 30/02 (2012.01)
H04L 29/12 (2006.01)

(52) U.S. Cl.
CPC ............ *H04L 12/1868* (2013.01); *G06Q 30/02* (2013.01); *H04L 12/189* (2013.01); *H04L 29/12594* (2013.01); *H04L 61/301* (2013.01); *H04L 61/3095* (2013.01)

(58) Field of Classification Search
USPC ........................................................ 707/610
See application file for complete search history.

(56) References Cited

U.S. PATENT DOCUMENTS

| 5,764,899 | A | 6/1998 | Eggleston et al. |
| 2004/0034712 | A1* | 2/2004 | Rajwan et al. ............... 709/231 |
| 2008/0027989 | A1 | 1/2008 | Lai et al. |
| 2008/0040666 | A1 | 2/2008 | Wang et al. |
| 2008/0243924 | A1* | 10/2008 | Barrett et al. ............ 707/104.1 |
| 2008/0271068 | A1* | 10/2008 | Ou et al. ....................... 725/32 |
| 2008/0301746 | A1* | 12/2008 | Wiser et al. ................. 725/114 |
| 2009/0119702 | A1* | 5/2009 | Jagannathan et al. .......... 725/32 |
| 2009/0150960 | A1* | 6/2009 | Pickens et al. .............. 725/118 |
| 2009/0172728 | A1* | 7/2009 | Shkedi et al. ................ 725/34 |

FOREIGN PATENT DOCUMENTS

EP    2528253 A1 * 11/2012

OTHER PUBLICATIONS

Subscriber Data Management: It's Time to Get Personal. Light Reading's Services Software Insider; vol. 4, No. 1. Feb. 2008.

(Continued)

*Primary Examiner* — Hung Q Pham

(57) ABSTRACT

The invention relates to a method for generating a personalized content file for a user entity using a file repair request for identifying a user. The file repair request is initiated by generating a preliminary file that is transmitted to the user entity, the preliminary file containing a predetermined placeholder. The preliminary file is transmitted to the user entity, the user entity starting the file repair request. The personalized content file is generated by replacing the predetermined placeholder in the preliminary file by a personalized content.

17 Claims, 3 Drawing Sheets

(56) References Cited

OTHER PUBLICATIONS

Lohmar, et al. Performance Evaluation of a File Repair Procedure based on a Combination of MBMS and Unicast Bearers. IEEE Proceedings of the 2006 International Symposium on a World of Wireless, Mobile and Multimedia Networks. 2006.

3GPP. $3^{rd}$ Generation Partnership Project; Technical Specification Group Services and System Aspects; Multimedia BroadcastiMulticast Service (MBMS); Protocols and Codecs (Release 7). 3GPP TS 26.346 v7.7,0 Mar. 2008.

Paila T. et al. FLUTE—File Delivery over Unidirectional Transport. Network Working Group; Request for Comments: 3926. Oct. 2004.

* cited by examiner

METHOD AND DEVICE FOR CONTENT PERSONALISATION USING FILE REPAIR REQUESTS

TECHNICAL FIELD

The invention relates to a method for generating a personalized content file for a user entity, to a broadcast multicast module generating a personalized content file for the user entity, and to a file repair module.

BACKGROUND

Multimedia broadcast multicast service (MBMS) is a broadcasting service that can be offered via existing GSM and UMTS cellular networks. MBMS enables efficient group-related data distribution services, especially on the radio interface. The basic idea is to use radio broadcast transmissions within geographical areas of high density of group members and to use point to point transmission resources in areas of low user density. In broadcast applications, a content is transmitted to a plurality of users in a certain area, whereas in a multicast application the content is only transmitted to some predetermined users. An advantage of MBMS can be seen in the fact that the transmission resources in the core network and radio network are shared.

In the market there is an increasing demand for personalizing content, e.g. for personalized advertisements or other content specially directed to a predetermined group of users.

However, with existing solutions personalizing content is complicated as support on the client side is needed. Furthermore, an efficient delivery of personalized content via multicast is not possible with existing solutions.

SUMMARY

Accordingly, a need exists to provide a possibility to generate personalized content for a user or a group of users.

This need is met by the features of the independent claims. In the dependent claims preferred embodiments of the invention are described.

According to one aspect of the invention, a method for generating a personalized content file for a user entity is provided. The method comprises the step of generating a preliminary file to be transmitted to the user entity the preliminary file containing a predetermined placeholder. The generated preliminary file containing the placeholder is then transmitted to the user entity. The user entity transmits a reply message said reply message being used to identify the user entity. The personalized content file is generated for the identified user entity by replacing the predetermined placeholder in the preliminary file by a personalized content resulting in the personalized content file. By the fact that the user entity is caused to send a reply message that is used for identifying the user this can be used to generate the personalized content file for the user identified by the reply message.

Preferably, the preliminary file transmitted to the user entity is configured in such a way that a request for transmission of a file repair message is initiated by the user entity. The file repair mechanic of the MBMS is used to personalize content delivery using the MBMS file download service. This can be achieved by transmitting a FLUTE file delivery table (FDT) to all users in the MBMS session which contains parts that are deliberately not transmitted. The parts constitute the placeholders for to be inserted personalized content. To the user entity however this appears as a standard case of a file lost during transmission and consequently the user entity requests a file repair for the missing parts at the broadcast multicast service center. This file repair request is the basis for the user entity identification.

The user entity can be identified by using an address information from where the reply message is received. However, it is not always possible to exactly identify one user entity when an address information such as an IP address is known as many user entities may use one IP address (e.g. in the case of a wireless LAN environment with several users using this wireless LAN connection). In another embodiment the user may be identified by retrieving a subscriber identity information from the reply message. By way of example, the user entity may be identified using the IMSI (international mobile subscriber identity) or the IMPI (IP Multimedia Private Identity).

When the user has been identified user characteristics of the user of the user entity and the user policy for said user can be determined. The personalized content is then determined in accordance with the user characteristics and the user policy. In this step, it is decided which content is appropriate for the user by correlating the policies that state which content is applicable for which user entity or for which group of user entities.

In an additional step, the personalized content is then adjusted in such a way that it fits into the placeholder in the preliminary file. When the placeholder has been replaced by the personalized content, the personalized content file is generated.

When the user policy and the user characteristics have been determined, a pointer can be generated pointing to the personalized content, the pointer being used for retrieving the personalized content replacing the placeholder. Additionally, a file delivery table for said preliminary file can be transmitted to the user entity the file delivery table comprising distinguishing data allowing to differentiate a reply message for a common file repair request from a reply message sent as a request used to generate the personalized content file. By way of example, a predetermined uniform resource information can be transmitted to the user entity, e.g. a predetermined URL, wherein the reply message initiating the generation of the personalized content file is identified by said predetermined uniform resource information.

The request initiating the personalized content file can be identified by transmitting a predetermined uniform resource information to the user entity, the reply message containing said predetermined uniform resource information can then be recognized as a message initiating the generation of the personalized content file.

In an additional step, the file repair server may be informed of the possible number of user entities that may transmit the reply message used for initiating a personalized content file generation. In another embodiment, the file repair server counts the reply messages received requesting the generation of a personalized content file. The knowledge about the number of user entities which will receive a personalized content file helps to optimize the load balancing for the file repair server. The information about the number of user entities could be obtained e.g. from possible registrations, received perception reporting or other broadcast metadata. In order to avoid that all user entities start sending their file repair requests at the same time, it is possible to provide an individual minimum waiting time to the user entity, the minimum waiting time enabling user entity to transmit the reply message requesting for the personalized content file only after expiry of the individual minimum waiting time. The minimum waiting time may be transmitted to the user entity, and the user entity randomly selects time for sending the request after expiry of said minimum waiting time. In another embodiment the user entity will randomly calculate a request sending time without having received an individual waiting time.

The invention furthermore relates to a broadcast multicast module generating a personalized content file for a user entity, the module comprising a file generating unit generating a preliminary file comprising a predetermined placeholder. Furthermore, an identification unit is provided identifying the user entity using a reply message received from the user entity in response to the preliminary file that was transmitted to the user entity. The file generating unit generates the personalized content file for the identified user entity by replacing the predetermined placeholder in the preliminary file by a personalized content resulting in the personalized content file. The personalized content is selected based on the identified user entity. This broadcast multicast module allows a point to multipoint delivery of personalized content which minimizes the costs associated to personalization. In case of a single user entity point-to-point delivery allows very fine granularity for personalization.

The identification unit preferably retrieves network information or subscriber identity information from the reply message for identifying the user entity. Preferably, the identification unit comprises a personalization unit providing additional information about the user of the user entity and/or providing a user policy for the identified user. The request for personalized content is sent to the personalization unit the personalization unit retrieving the user policy or additional information about the user from a context information module. The context information module makes available any context information of a certain user, e.g. a user group, a location or any other context. The data could be stored physically in a home location register (HLR or HSS (Home Subscriber Server), a user database or a position determining function.

The broadcast multicast module comprises a file repair module carrying out the conventional file repair requests. This file repair module should contain or may have access to the distinguishing data allowing the file repair module to differentiate a common file repair request from the request for the generation of the personalized content file. When the file repair module has identified a request for generating the personalized content file, the file repair request is transmitted to the personalization unit. After having identified the user entity, the personalization unit retrieves the personalized content from a personalized content source and fits the personalized content into the placeholder of the preliminary file. For identifying the personalized content, the personalization unit may match the retrieved user information and the user policy with the content of the personalized content source in order to generate the personalized content. When the personalized content file has been generated, the personalization unit may transmit the personalized content file to the file repair module, the file repair module transmitting the personalized content file to the user entity.

The invention furthermore relates to a file repair module storing predetermined distinguishing data where in the file repair module uses the distinguishing data in order to determine whether the creation of a personalized content file for a user entity is to be initiated or not.

BRIEF DESCRIPTION OF THE DRAWINGS

The invention will be described in further detail below with reference to the accompanying drawings, in which.

DETAILED DESCRIPTION

Figure 1:
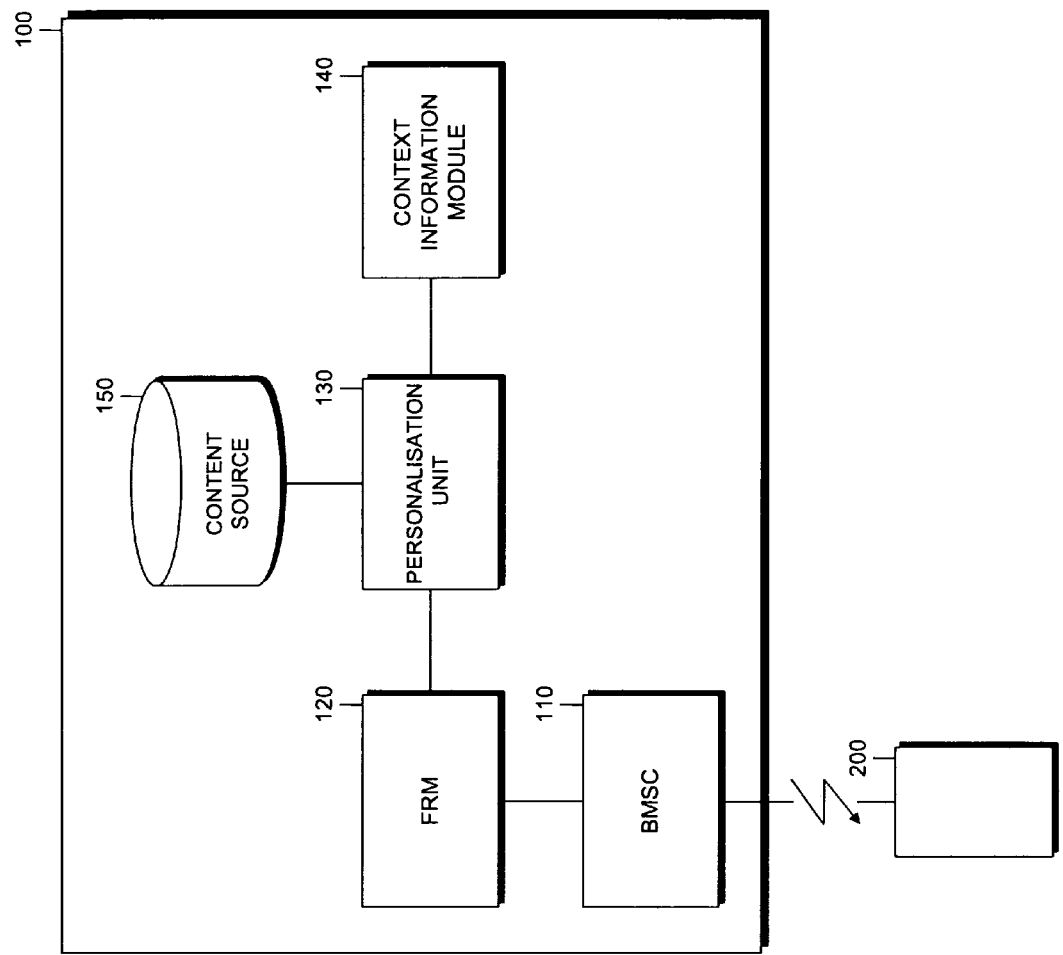
FIG. 1 is a schematic view of a broadcast multicast module generating personalized content files.

In FIG. 1 a broadcast multicast module 100 is shown which can be used for generating a personalized content file. The module 100 comprises a broadcast multicast service center (BMSC) 110 which controls the delivery of data either in a broadcast modus in which data are transmitted to all users in a certain broadcast area. The broadcast multicast service center is furthermore configured to transmit data only to those users or user entities 200 which have registered for receiving certain data. In the multicast operating mode, the BMSC has to know the users in order to determine to which user a certain content is delivered. The broadcast multicast service center 110 is connected to a file repair module 120, a file repair module repairing data transmitted to the user entity which were not transmitted completely. For the streaming of media, a real time transport protocol (RTP) is used which uses a user datagram protocol (UDP). For downloading data to the user entity 200, a file delivery over unidirectional transport (FLUTE) protocol is used. During the transmission using the FLUTE protocol, errors in the transmitted data content can occur. In order to correct these transmission errors, the file repair module 120 is provided. In the present embodiment, a FLUTE file delivery table (FDT) is transmitted to all users in the transmission session which contains parts that are deliberately not transmitted. These parts constitute predetermined placeholders for to be inserted personalized content. The file delivery table comprising said predetermined placeholders is transmitted to the user entity 200. The user entity 200 receives the file delivery table and it appears to the user entity 200 as a standard case of a file lost during transmission and it consequently requests a file repair for the missing parts at the BMSC 110. The BMSC 110 transmits it to the file repair module 120.

As will be explained in detail further below, the data transmitted to the user entity and the reply message received from the user entity comprise distinguishing data allowing to distinguish a normal file repair request from a request for the generation of personalized content. When the file repair module has recognized the distinguishing data in the reply message received from the user entity 200, the file repair module forwards the request to a personalization unit 130. The personalization unit 130 retrieves the identity of the user entity on the basis of the reply message received from the user entity and access a content information module 140 in order to retrieve context information for the identified user. The context information module 140 makes any context information of a certain user or a user group available. By way of example, the context information module decides depending on the age of the user of the user entity or depending on the subscribed user groups which content the user should receive. The personalization unit matches the retrieved user information and user policy with a content from a content source 150. The content source may be an FTP server or an advertisement register or any other source of content. Besides a possible remote entity, this module could also be included in the personalization unit 130, where e.g. personalized strings are generated by a separate algorithm. The personalization unit transmits the personalized content to the file repair module 120 which then inserts the personalized content and transmits the personalized content via the BMSC 110 to the user entity 200. Accordingly, the personalization unit translates the placeholder transmitted to the user entity 200 into the actual content to be delivered to the user. The personalization unit 130 can also be in charge of exactly adjusting the personalized content to fit into the placeholder.

Figure 2:
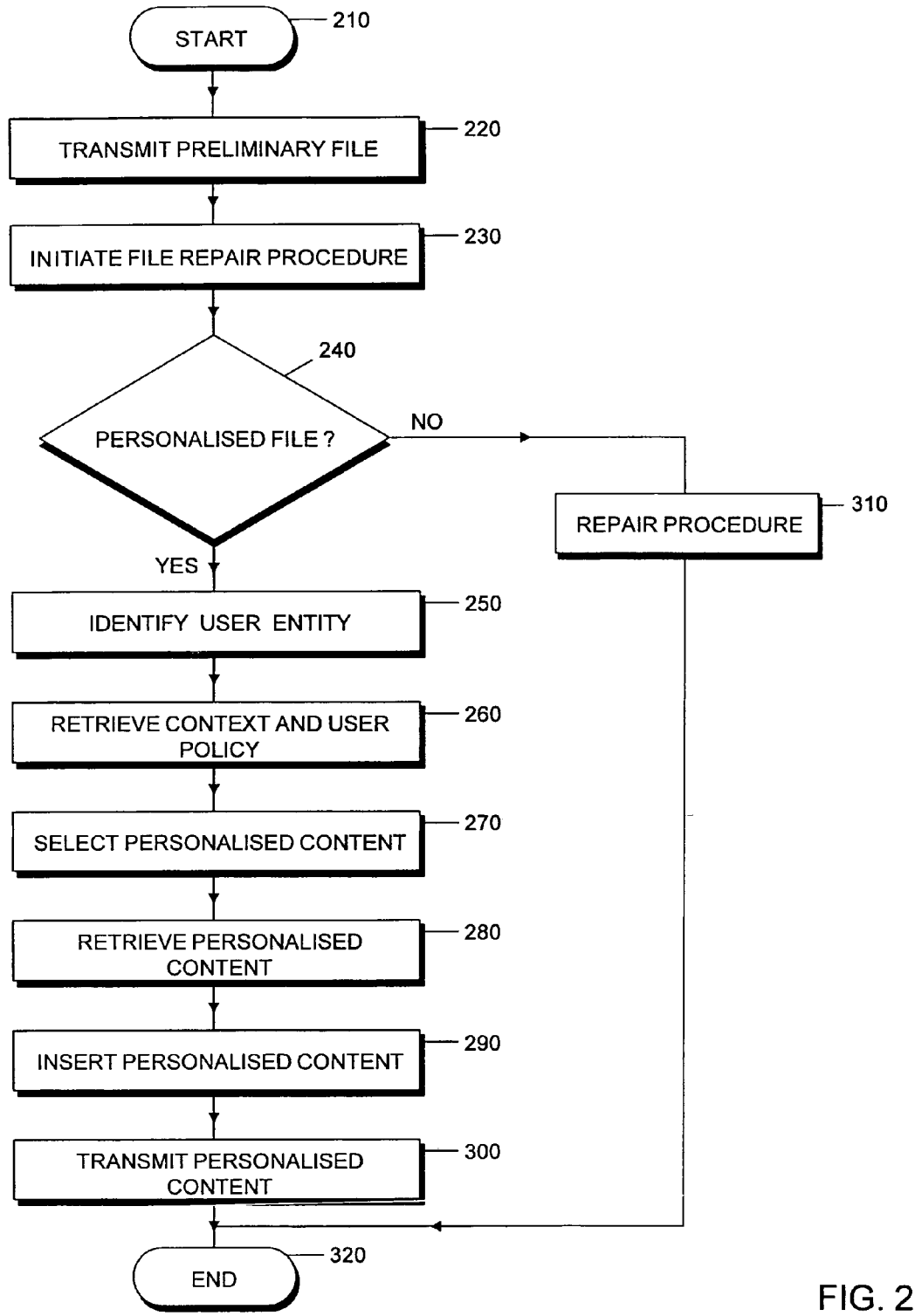
FIG. 2 is a flowchart showing the main steps for generating a personalized content file for a user entity.

In FIG. 2, the steps carried out for generating a personalized content file are summarized. The method starts in step 210. Before the preliminary file is transmitted to the user entity in step 220, the BMSC 110 and the FRM 120 exchange session details. This means that before starting a new broadcast session that includes personalized content, the BMSC and the file repair module 120 exchange the relevant information regarding the session data. These data include among others the session ID, the session start, the file delivery table data and the placeholder URLs for which later, the personalized content should be inserted. If the personalized content should only be inserted in a part of the original content, the file repair module 120 and the BMSC 110 also need to exchange the detailed position and possibly the context of the replaceable content. To optimize the load balancing for the file repair module, the BMSC 110 could also send information regarding the possible number of receivers that are later expected to request personalized content.

When the preliminary file is received at the user entity, it is noticed that some data are missing due to the placeholder transmitted together with the data. Accordingly, a file repair procedure is initiated in step 230. When the file repair request is received at the file repair module, it is asked whether it is a request for a personalized file or whether it is a normal file repair request with which the transmission of the missing data is requested (step 240). If the request is identified as being a request for the generation of a personalized content file, the user entity, and therefore the user, has to be identified in step 250. When the user entity is known, it is possible to retrieve the context information and user policy in step 260. When the context information and policies are known, the personalized content has to be selected in step 270 and retrieved from the content source 150 in step 280. In step 290, the personalized content has to be fitted to exactly fit the placeholder. In step 300, the personalized content is then transmitted to the user entity.

In case it is detected in step 240 that the reply message was not a message for the generation of a personalized content file but a common file repair request, the common repair procedure is carried out with the retransmission of the missing parts of the file.

For both cases the method ends in step 320.

Figure 3:
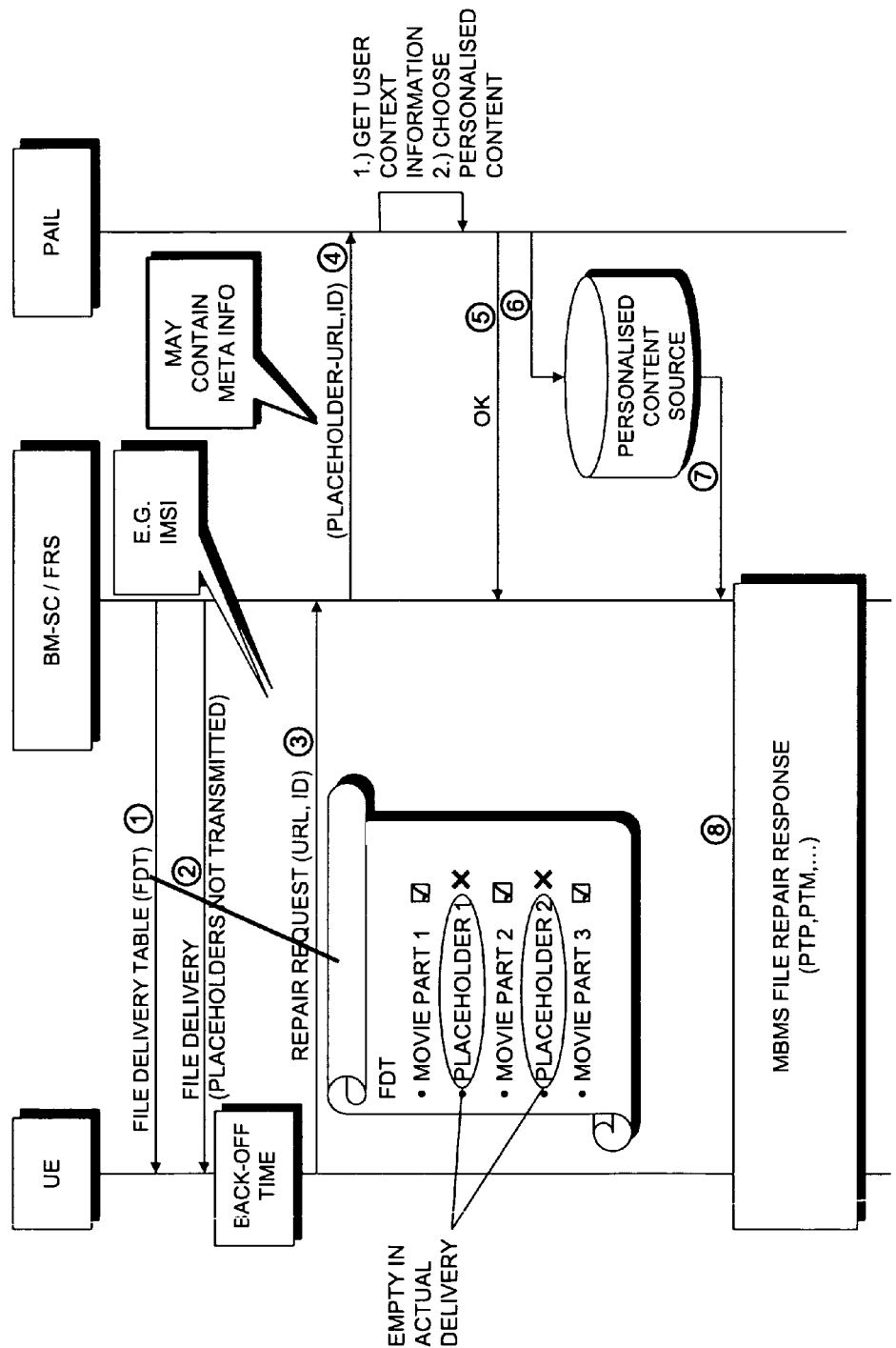
FIG. 3 illustrates the basic transmission and insertion concept together with the different entities involved.

In FIG. 3, the interaction between the different entities and the steps carried out by the different entities are shown in more detail. As discussed in connection with FIG. 2, the BMSC 110 and the file repair module 120 exchange the relevant information regarding the session data. In the first step, the BMSC starts broadcasting the session to the users. The session includes the before-exchanged file delivery table and the URL for the file repair requests. The file delivery table or any other session description elements include information signaling that the session will provide personalization. In the actual session, the BMSC omits the payload packets that were negotiated for the content personalization.

In a third step, the user entity triggers the file repair procedure. During or after the session reception, the user entities will detect scheduled packets are missing. The user entities will start to initiate a file repair request to retrieve the missing data. To avoid that all user entities start sending their file repair request at the same time, FLUTE offers different possibilities to distribute the requests over time, i.e. all clients are initially provided with time values indicating a minimum waiting time before sending their request. In addition to that minimum waiting time, a back-off time is communicated in which the user entities randomly select their exact request sending time. At this individual time, the user entities address their request via the BMSC to the file repair server and they will also include their MSISDN (Mobile Subscriber International ISDN) or any other personal identifier in the request.

In step 4, the file repair server distinguishes between conventional file repair requests and personal file repair requests by using the information exchanged with the BMSC before step 1. This is achieved by evaluating the URI identifying the requested packets. If this URI matches the one sent as a placeholder for personalized content a request for personalized content is sent to the personalization unit named "personalization and advertisement insertion and logic" (PAIL) in the context of FIG. 3. If it is any other URI, the normal file repair procedure takes place, e.g. already sent packages are sent again.

In step 5, the file repair module sends the request for personalized content to the PAIL or personalization unit with an identifier of the requesting user. The PAIL requests context information about this user from the context information module 140. In this step, the personalization unit could also decide about the granularity of personalization or possible groupings. This decision could be based on a number of receivers and/or their density. It could also influence the context information query, e.g. just considering the location in order to reduce the query and matching complexity as well as to save network and radio resources.

Additionally, the second element required to choose appropriate content are policies which specify which content is applicable to which user group at which time of the day etc. The policies will often also contain a priority value to resolve conflicting policies, e.g. when more than one personalized ad is applicable to a given user. Whether the information is stored or cached in the personalization unit or if it is retrieved on demand from an external source like the content storage can be decided in one or the other way.

In step 6, the PAIL selects retrieves and inserts the personalized content. The policies and the retrieved context information are then correlated and a decision which personalized content that is most suitable for this particular user is derived. This could e.g. be an advertisement. This content is retrieved from the Personalised Content Source. Optionally, the PAIL performs media adaptation or padding in order to fit the content exactly in the placeholder.

In step 7, the PAIL forwards personalized content to the FRS. The PAIL forwards the tailored content to the FRS. The FRS sends this content within the file repair response to the terminals. This forwarding is either performed via a unicast transmission or can be also done via another broadcast session, e.g. if a large group of receivers should get the same personalized content.

In step 8, the terminal renders content. The terminal receives the personalized file repair response and inserts this content as repaired packets in the original context.

Summarizing, the invention provides a possibility for generating personalized content files which scales from very coarse-grained to fine-grained personalization. The described point to multipoint delivery of frequently personalized content is an effective way for distributing and minimized the costs associated to personalization.

The invention claimed is:

1. A method of generating a personalized content file for a user entity, comprising the steps of:

generating a preliminary file to be transmitted to the user entity, the preliminary file containing a predetermined placeholder;

transmitting said preliminary file to the user entity;

transmitting a file delivery table for said preliminary file to the user entity, wherein the transmitted file delivery table comprises distinguishing data;

receiving a reply message including a file repair request from the user entity in response to the preliminary file, wherein the file repair request includes the distinguishing data used to differentiate the file repair request from a common file request;

identifying the user entity by the reply message received from the user entity;

recognizing the file repair request as a request to generate the personalized content file using the distinguishing data; and generating the personalized content file for the identified user entity, in response to the recognized file repair request, by replacing the predetermined placeholder in the preliminary file with personalized content resulting in the personalized content file.

2. The method according to claim 1, wherein an address information, from where the reply message is received, is used for identifying the user entity.

3. The method according to claim 1, wherein a subscriber identity information retrieved from the reply message is used in order to identify the user entity.

4. The method according to claim 1, further comprising the step of retrieving user characteristics of a user of the user entity and retrieving a user policy for said user, wherein the personalized content is determined in accordance with the user characteristics and the user policy.

5. The method according to claim 1, further comprising the step of adjusting the personalized content in such a way that it fits into the placeholder in the preliminary file.

6. The method according to claim 1, further comprising the step of informing a file repair server of a possible number of user entities that may transmit the reply message.

7. The method according to claim 1, further comprising the step of providing an individual minimum waiting time to the user entity, the individual minimum waiting time enabling the user entity to transmit the reply message only after expiration of said individual minimum waiting time.

8. The method according to claim 1, wherein a predetermined uniform resource information is transmitted to the user entity, wherein the reply message initiating the generation of the personalized content file is identified by said predetermined uniform resource information.

9. The method according to claim 1, further comprising the step of generating a pointer to the personalized content, the pointer being used for retrieving the personalized content replacing the placeholder.

10. The method according to claim 1, wherein the personalized content file is transmitted to a plurality of users of one user group.

11. A broadcast multicast system for generating a personalized content file for a user entity, the broadcast multicast system comprising:
a processor;
a non-transitory storage medium containing instructions that, when executed by the processor, cause the broadcast multicast system to:
generate a preliminary file to be transmitted to the user entity, the preliminary file containing a predetermined placeholder;
transmit said preliminary file to the user entity;
transmit a file delivery table for said preliminary file to the user entity, wherein the transmitted file delivery table comprises distinguishing data;
receive a reply message including a file repair request from the user entity in response to the preliminary file, wherein file repair request includes the distinguishing data used to differentiate the file repair request from a common file request;
identify the user entity by the reply message received from the user entity;
recognize the file repair request as a request to generate the personalized content file using the distinguishing data; and
generate the personalized content file for the identified user entity, in response to the recognized file repair request, by replacing the predetermined placeholder in the preliminary file with personalized content resulting in the personalized content file.

12. The broadcast multicast system according to claim 11, further configured to retrieve network information or subscriber identity information from the reply message in order to identify the user entity.

13. The broadcast multicast system according to claim 11, further configured to provide additional information about a user of the user entity or to provide a user policy for the identified user.

14. The broadcast multicast system according to claim 13, further configured to fit the personalized content into the placeholder of the preliminary file.

15. The broadcast multicast system according to claim 13, further configured to retrieve the additional information about the user and the user policy from a context information module.

16. The broadcast multicast system according to claim 15, further configured to match the retrieved additional information about the user and the user policy with the content from the personalized content source for generating personalized content.

17. A non-transitory storage medium storing instructions that, when executed by a processor, perform an operation comprising:
generating a preliminary file to be transmitted to the user entity, the preliminary file containing a predetermined placeholder;
transmitting said preliminary file to the user entity;
transmitting a file delivery table for said preliminary file to the user entity, wherein the transmitted file delivery table comprises distinguishing data;
receiving a reply message including a file repair request from the user entity in response to the preliminary file, wherein file repair request includes the distinguishing data used to differentiate the file repair request from a common file request;
identifying the user entity by the reply message received from the user entity;
recognizing the file repair request as a request to generate the personalized content file using the distinguishing data; and
generating the personalized content file for the identified user entity, in response to the recognized file repair request, by replacing the predetermined placeholder in the preliminary file with personalized content resulting in the personalized content file.

* * * * *